United States Patent [19]

Mylenek

[11] 4,222,281
[45] Sep. 16, 1980

[54] SINGLE SHIFT RAIL MANUAL TRANSMISSION WITH OVERDRIVE SPEED RATIO

[75] Inventor: Chester Mylenek, Detroit, Mich.

[73] Assignee: Ford Motor Company, Dearborn, Mich.

[21] Appl. No.: 889,686

[22] Filed: Mar. 24, 1978

[51] Int. Cl.² .................. G05G 5/10; G05G 9/12; F16H 3/38
[52] U.S. Cl. .................. 74/339; 74/473 R; 74/476; 74/477
[58] Field of Search .................. 74/473 R, 477, 359, 74/360, 339, 476, 331

[56] References Cited

U.S. PATENT DOCUMENTS

| | | | |
|---|---|---|---|
| 1,973,553 | 9/1934 | Austin | 74/473 R |
| 1,980,644 | 11/1934 | Vandervoort | 74/477 |
| 2,055,770 | 9/1936 | Manville | 74/473 R |
| 3,202,005 | 8/1965 | Ivanchich | 74/473 R |
| 3,929,029 | 12/1975 | Kelbel | 74/473 R |

FOREIGN PATENT DOCUMENTS

| | | | |
|---|---|---|---|
| 1008556 | 10/1965 | United Kingdom | 74/473 R |
| 1038591 | 8/1966 | United Kingdom | 74/473 R |
| 1053353 | 12/1966 | United Kingdom | 74/473 R |
| 1195167 | 6/1970 | United Kingdom | 74/473 R |
| 1501674 | 2/1978 | United Kingdom | 74/360 |

*Primary Examiner*—Allan D. Herrmann
*Attorney, Agent, or Firm*—Frank G. McKenzie; Donald J. Harrington

[57] ABSTRACT

A multiple ratio manual power transmission mechanism for an automotive vehicle comprising main torque delivery gears and a cluster gear assembly having gear elements engageable with each of the main torque delivery gears, a pair of double acting synchronizer clutch mechanisms for selectively actuating four of said main torque delivery gears to establish two underdrive ratios, a direct-drive ratio and an overdrive ratio, and a single shift rail and shift lever assembly for actuating said synchronizer clutch mechanisms including a first motion reversing lever assembly establishing a connection between the single shift rail and the synchronizer clutch mechanism for third and fourth ratio changes and another lever assembly for reversing the motion imparted to a reverse drive pinion by the single shift rail, the reverse drive pinion being shiftable to a driving position or to an inoperative position and the synchronizer clutch mechanism for the first and second speed ratio changes including an integral main drive gear that forms a part of the reverse torque delivery path.

3 Claims, 7 Drawing Figures

SINGLE SHIFT RAIL MANUAL TRANSMISSION WITH OVERDRIVE SPEED RATIO

BRIEF DESCRIPTION OF THE INVENTION

My invention relates generally to improvements in a multiple ratio transmission mechanism of the type shown generally in prior art U.S. Pat. Nos. 3,935,752; 3,550,467; and 3,962,930. These references show examples of manual power transmission mechanisms that employ synchronizer clutches for establishing selectively any one of several forward driving ratios and a reverse drive ratio. The clutch mechanisms are actuated by a single shift rail that is under the control of the operator. The improvements of my invention comprise a high speed ratio gear train that includes an overdrive gear at a location intermediate the torque transmitting gears for the direct drive ratio and the second speed underdrive ratio. Provision is made in the single shift rail shifting mechanism for blocking the motion of the inactive synchronizers as each of the other synchronizers is activated during speed ratio changes.

Compound motion is imparted to the shift rail by a shift cane mechanism mounted adjacent the tailshaft extension housing. In a preferred embodiment of my invention the shift cane and its supporting structure are secured to the tailshaft extension housing of the transmission mechanism by a bolted connection that permits the cane mechanism to be mounted at any one of several locations depending upon the requirements of the particular vehicle driveline installation. This avoids the necessity for providing separate transmission cast housings and tailshaft extensions and allows one cast housing and extension design to be used for several vehicle installations.

PARTICULAR DESCRIPTION OF THE INVENTION

Figure 1:
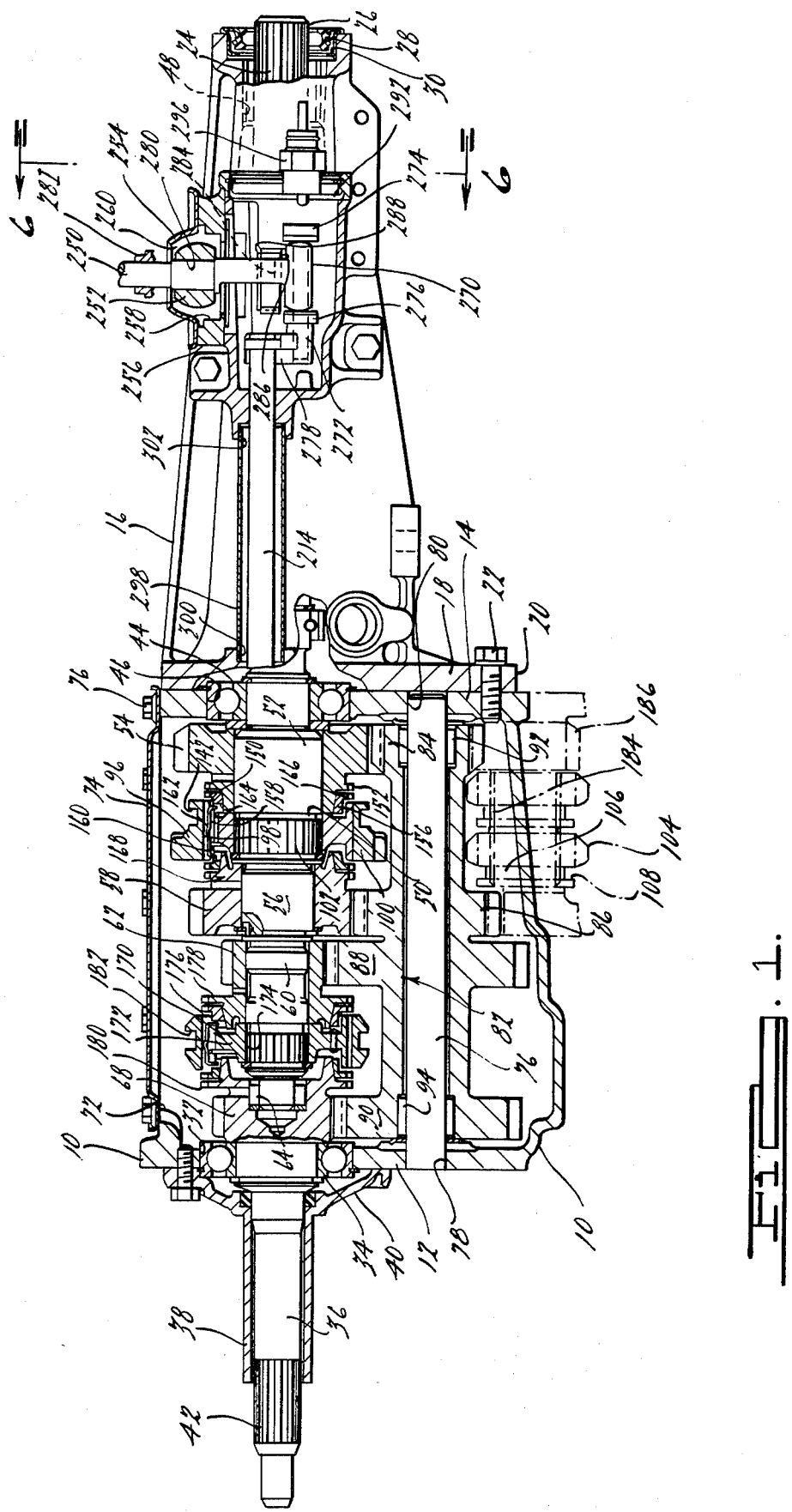
FIG. 1 is a marginal cross-sectional view of the multiple ratio forward transmission mechanism embodying the improvements of my invention.

In FIG. 1 reference character 10 represents a transmission housing that contains the torque transmitting gear elements. It includes a forward wall 12 and a rearward wall 14. A tailshaft extension housing 16 is secured to the rearward wall 14. Housing 16 includes a forward wall 18 having a flange 20 for accommodating bolts 22 which secure the extension housing 16 to the housing 10. A power output shaft 24 extends through the extension housing 16. It is splined, as shown at 26, to permit a driving connection with an internally splined slip yoke shaft which forms a part of a universal joint connection with a drive shaft that extends to the differential gearing in the vehicle driveline, the output torque of the differential gearing being distributed to the traction wheels for the vehicle. An extension shaft seal assembly 28 is received within a shaft opening 30 in the extension housing for sealing the output shaft 24 and the associated slip yoke assembly not shown in FIG. 1.

The forward wall 12 of the housing 10 is provided with a bearing 32 which receives front bearing 34 for torque input shaft 36. A stationary clutch sleeve shaft support 38 is carried by cover plate 40, which is bolted to the front wall 12 over the bearing opening. Input shaft 36 is splined at 42 to permit a driving connection with the friction clutch disc of a selectively engageable friction clutch through which torque is delivered from the engine flywheel of an internal combustion engine to the shaft 36.

The output shaft 24 at its inboard end is journalled by bearing 44 in bearing opening 46 formed in end wall 14. The outboard end of the shaft 24 is journalled in bearing 48.

The output shaft 24 forms a part of and is integrally joined to intermediate shaft 50, which has formed thereon a first bearing portion 52 which journals low speed ratio gear 54, a second bearing portion 56 which journals a second speed ratio gear 58 and a third bearing portion 60 which journals overdrive gear 62. The forward end of the intermediate shaft 50 is journalled by bearing 64 in bearing opening 66 formed in torque input gear 68. The input shaft 36 forms a part of and is integrally joined to the input gear 68. The shaft 36 is sealed by seal element 70 carried in a seal pocket formed in the cover plate 40.

The upper end of the transmission housing 10 is provided with an access opening 72, which is covered by a stamped sheet metal cover 74 that is bolted in place by appropriately spaced clamping bolts 76 threadably received in the top of the housing 10. A transmission countershaft 76 is disposed in the housing 10 and is supported at its forward end in countershaft openings 78 formed in the wall 12. It is supported at its rear end in opening 80 formed in the wall 18. Countershaft 76 rotatably supports a cluster gear assembly generally indicated by reference numeral 82 which has formed thereon spaced gear elements 84, 86, 88 and 90. These, respectively, mesh with gears 54, 58, 62 and 68, which hereafter will be referred to as input gears or main gears in contrast to the corresponding parts of the cluster gear assembly, which will be referred to as cluster gear elements. The cluster gear assembly 82 is journalled at its rearmost end by bearing 92 on the countershaft 76 and is journalled at its forward end by bearing 94 on the countershaft 76.

A reverse gear 96 is formed on synchronizer clutch sleeve 98, which is internally splined in sliding relationship on an externally splined synchronizer hub 100 for the 1-2 shift and the 2-1 shift. Hub 100, in turn, is splined at 102 to the intermediate shaft 50.

Reverse gear 96 is shown in its operative position for reverse drive in FIG. 1. This corresponds to the neutral condition for the synchronizer clutch assembly. When the gear 96 is in the position shown, it engages a reverse drive pinion 104 which is mounted slidably on a reverse pinion support shaft 106. Shaft 106, in turn, is supported at each of its ends in an opening formed in bosses that form a part of the transmission housing 10. Reverse pinion 104 is seen in its edge view in FIG. 1 and is seen in its end view in FIG. 5. Reverse pinion 104 has an extension on which is formed a groove 108.

When the pinion 104 is shifted in a right hand direction as viewed in FIG. 1, it moves out of mesh with the reverse gear 96. When it is moved to its left hand position as shown in FIG. 1, it is capable of being engaged by the reverse gear 96 to establish a reverse torque delivery path. Groove 108 is engaged by shift fork 110 as seen in FIG. 5.

To establish the operative or inoperative position for the pinion 104, the operating end 112 of the fork 110 engages the groove 108. The shift fork 110 is supported by shift fork rail 114 which in turn is supported at its rearward end 116 in opening 118 formed in the wall 14 as seen best in FIG. 3. Shift fork rail 114 is supported at its forward end 120 in opening 122 formed in boss 124, which forms a part of the transmission housing 10. The rear shift fork 110 is pinned to the shift fork rail 114 by pin 126. Also best seen in FIG. 3.

Figure 3:
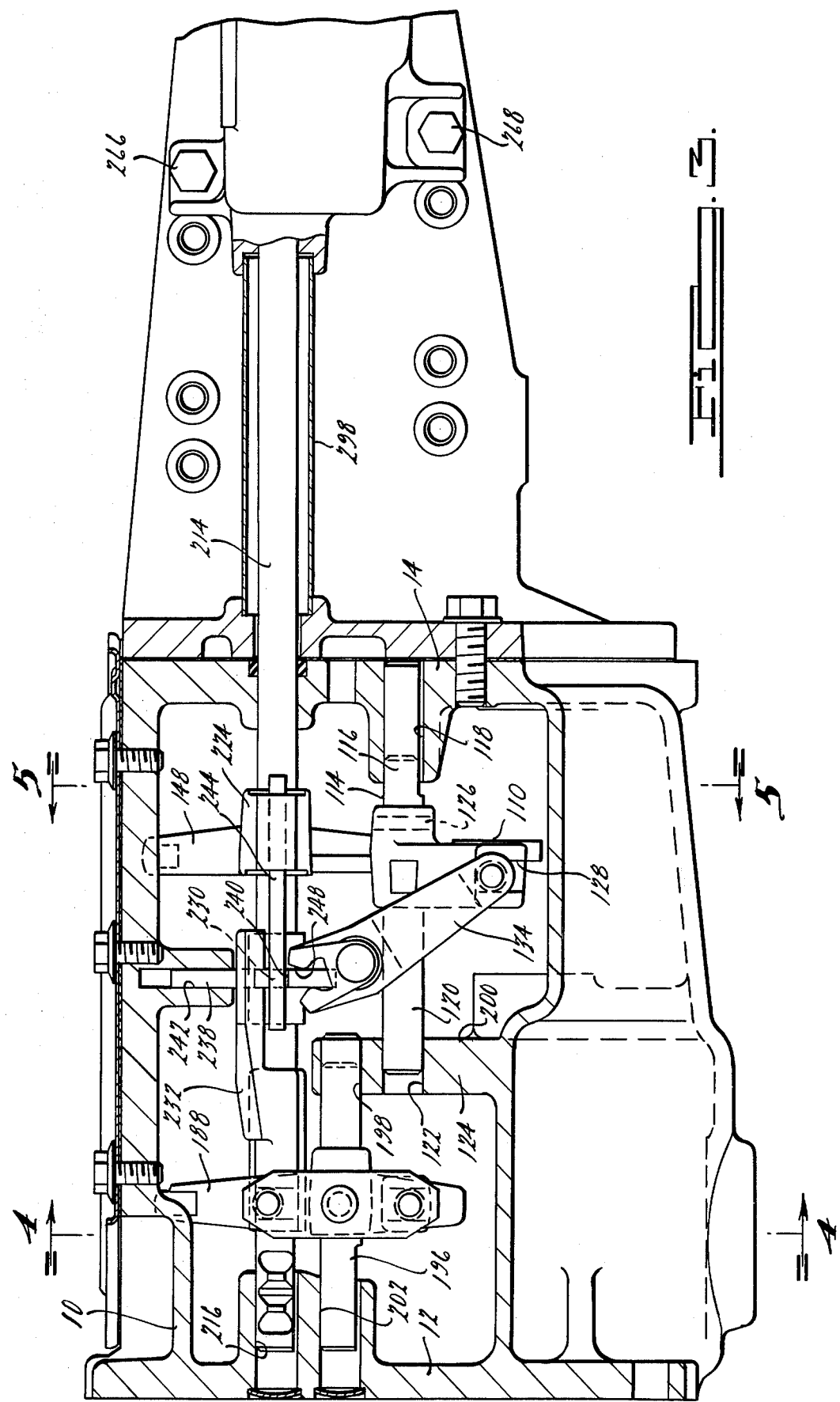
FIG. 3 is a cross-sectional view taken along the plane of section line 3—3 of FIG. 2.
Figure 5:
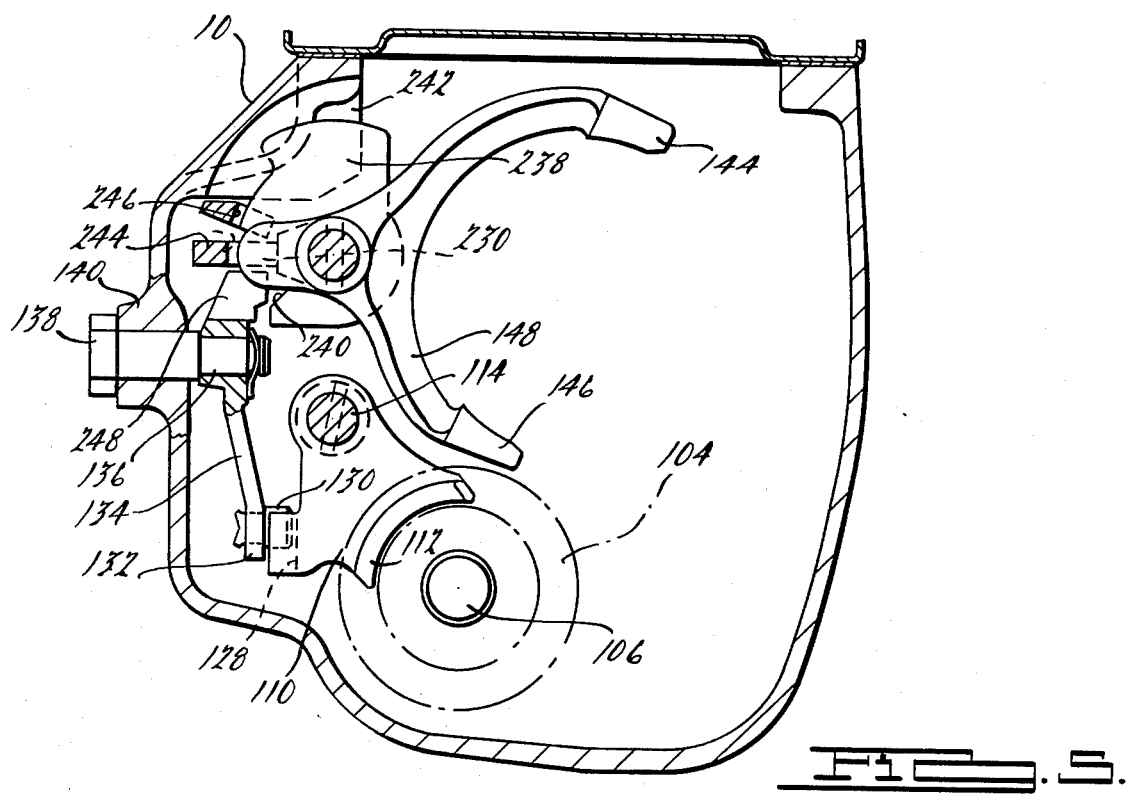
FIG. 5 is a cross-sectional view taken along the plane of section line 5—5 of FIG. 3.

The reverse shift fork 110 is provided with an operating groove 128 seen in FIGS. 3 and 5. Received in the groove 128 is a pin 130 which is carried in the lower end 132 of relay lever 134, which in turn is pivoted on stub shaft 136. This shaft 136 is formed on the inboard end of bolt 138 received in the threaded opening formed in boss 140 for the transmission housing 10.

When the relay lever 134 is oscillated about the axis of the shaft 136, it shifts axially the reverse shift fork 110.

The 1–2 synchronizer clutch sleeve 98 is provided with a shift fork groove 142 for receiving the operating ends 144 and 146 of the 1–2 shift fork 148, as best seen in FIG. 5.

Synchronizer clutch sleeve 98 is formed with internal clutch teeth 150 which are adapted to engage external synchronizer clutch teeth 152 formed on the low speed ratio main gear 54. Synchronizer clutch blocker ring 156 is provided with a cone clutch surface that registers with external cone clutch surfaces on the gear 54 in known fashion to establish synchronism in the rotational velocities of the sleeve 98 with respect to the gear 54 prior to a shift to the low speed ratio condition. The synchronizer clutch is actuated by the force applied to the ring 156 by synchronizer clutch inserts 158, which are urged in a radially outward direction by a clutch spring 160. An axial force is applied to the synchronizer clutch inserts by detent projections 162 which register with a detent groove formed in the clutch teeth 150. A lost motion driving connection between the synchronizer clutch 100 and the gear 54 is provided to limit the extent of relative movement of the gear 54 relative to the clutch ring 156. This is achieved by the inserts 158, the ends of which enter clutch ring slots, one of which is shown at 164.

Blocker ring teeth 166 formed on the blocker ring 156 prevent shifting movement of the sleeve 98 into clutching engagement with the clutch teeth 152 when the motion of the intermediate shaft 50 is out of synchronism with the motion of the gear 54. When synchronism is established, sleeve 98 can be moved to the clutching position to establish low speed ratio. At that time torque is distributed from the input shaft 36 and through the input main gear 68 to the cluster gear element 90. Torque then passes from cluster gear element 84 and through main gear 54 to the intermediate shaft 50 and the output shaft 24.

Main gear 58 also is adapted to be selectively connected to the intermediate shaft 50 through a synchronizer clutch mechanism identified generally by reference character 168. The synchronizer clutch mechanism corresponds to the one described previously with reference to the low speed ratio main gear 54. It is actuated when the sleeve 98 is shifted in a left hand direction as viewed in FIG. 1, thereby establishing a second underdrive ratio as the gear 58 is connected to the intermediate shaft 50 and the output shaft 24. Torque is delivered to the gear 58 from the cluster gear element 86 with which it meshes.

When the sleeve 98 is shifted to the neutral position intermediate the two associated synchronizer clutch structures, both gears 58 and 54 are disconnected from the intermediate shaft 50 and the associated reverse gear 96 is positioned so that it may be engaged by reverse pinion 104 as the latter is shifted in a left hand direction as viewed in FIG. 1. The shifting that occurs by means of the shifting mechanism described previously will be discussed with reference to FIG. 5.

A 3–4 synchronizer clutch mechanism is indicated generally by reference character 170. It includes a synchronizer hub 172 that is splined at 174 to the forward end of the intermediate shaft 50. The synchronizer assembly 170 includes also a synchronizer clutch sleeve 176, which has internal clutch teeth adapted to register with clutch teeth 178 on gear 62 when the sleeve 176 is moved in a rearward direction and which is adapted to engage clutch teeth 180 on gear 68 when the sleeve 176 is moved in a forward direction. A pair of synchronizers, similar to the synchronizer described with reference to the gear 54, is provided for each of the gears 62 and 68. The sleeve 176 is provided with a shift fork groove 182, which receives the ends of the 3–4 shift fork described with reference to FIG. 4.

To condition the mechanism for third speed ratio and direct drive operation, the synchronizer clutch sleeve 98 is moved to the neutral position as shown in FIG. 1 and the sleeve 176 is moved to a forward direction thereby connecting the input main gear to the intermediate shaft 50. A shift to the overdrive high speed ratio is achieved by moving the synchronizer clutch sleeve 176 in a rearward direction whereby input torque is distributed from the input shaft through gear 68, gear elements 90 and 88 and high speed overdrive ratio gears 62, which becomes locked to the intermediate shaft.

The reverse drive pinion 104 is splined at 184 to the reverse drive pinion shaft. Reverse drive pinion 186 is secured or integrally formed with the reverse pinion shaft, and it meshes with the cluster gear element 84. Thus during reverse drive operation, the torque delivery path is comprised of input shaft 36, input gear 68, cluster gear element 90, cluster gear element 84, reverse pinion 186, reverse pinion 104 and reverse drive gear 96.

Figure 4:
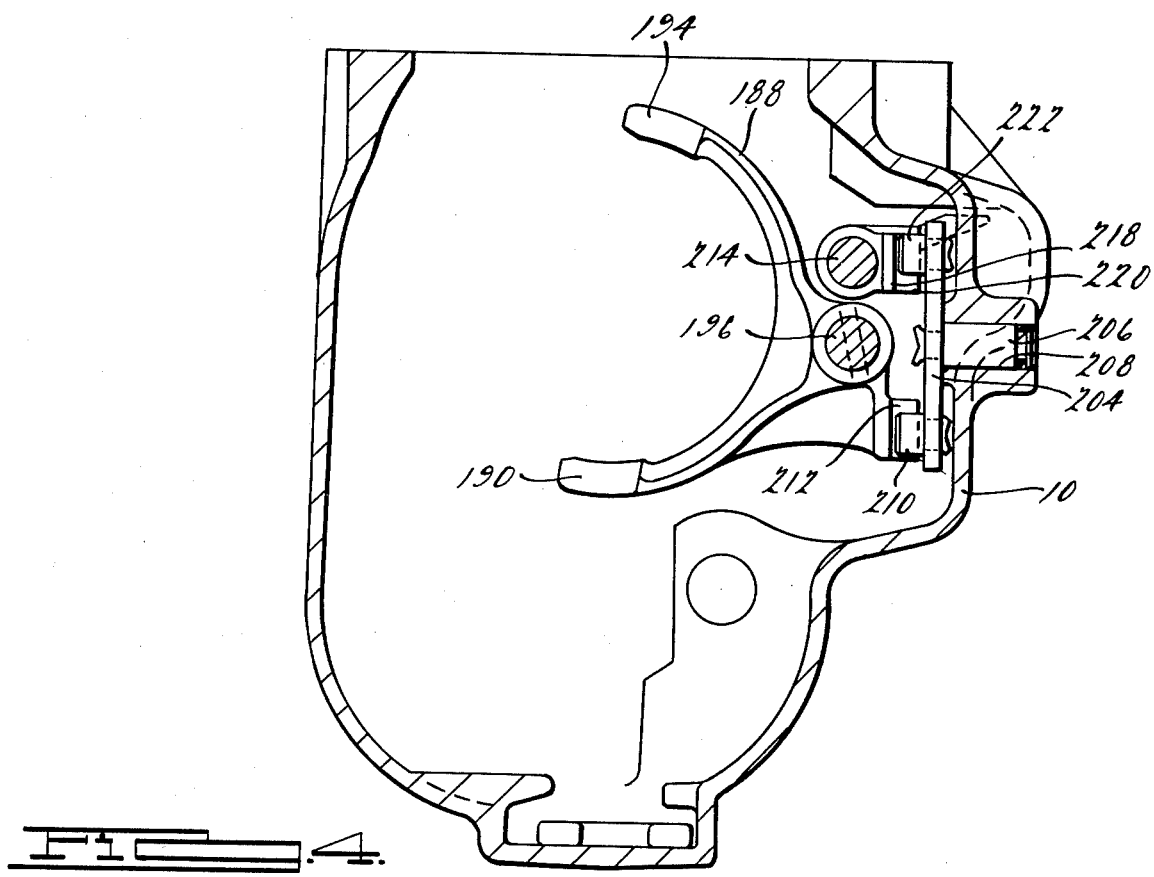
FIG. 4 is a cross-sectional view taken along the plane of section line 4—4 of FIG. 3.

The 3–4 synchronizer clutch sleeve 176 is shifted by the shift fork 188, seen in FIG. 4. Fork 188 includes fork ends 190 and 194 adapted to be received in groove 182. Fork 188 is supported by fork shaft 196, which is end supported in an opening 198 formed in boss 200 in the housing 10 and in a corresponding opening 202 formed in the forward wall 12 of the housing 10.

A reversing lever 204 is mounted on pin 206 received in opening 208 formed in the housing 10 as seen in FIG. 4. The lower end of the reversing lever 204 carries a pin 210, which is engaged in a shift fork groove 212 formed in the shift fork 188. A shift rail 214 is slidably supported at its forward end in opening 216 formed in the wall 12 as seen best in FIG. 3. Rail 214 carries a collar 218, which is formed with a groove 220. A pin 222 carried at the upper end of reverse lever 204 registers with groove 220 when the rail 214 is shifted in the direction of its axis. The collar 218, which is fixed to it, causes the reversing lever 204 to be rotated about its axis, thereby shifting the shift fork 188 in a direction opposite to the direction of the shifting movement of the shift rail 214. Thus when the shift rail 214 is shifted in a left hand direction, as viewed in FIG. 3, the clutch sleeve 176 is shifted in a right hand direction as seen in FIG. 1. This establishes an overdrive condition.

Figure 2:
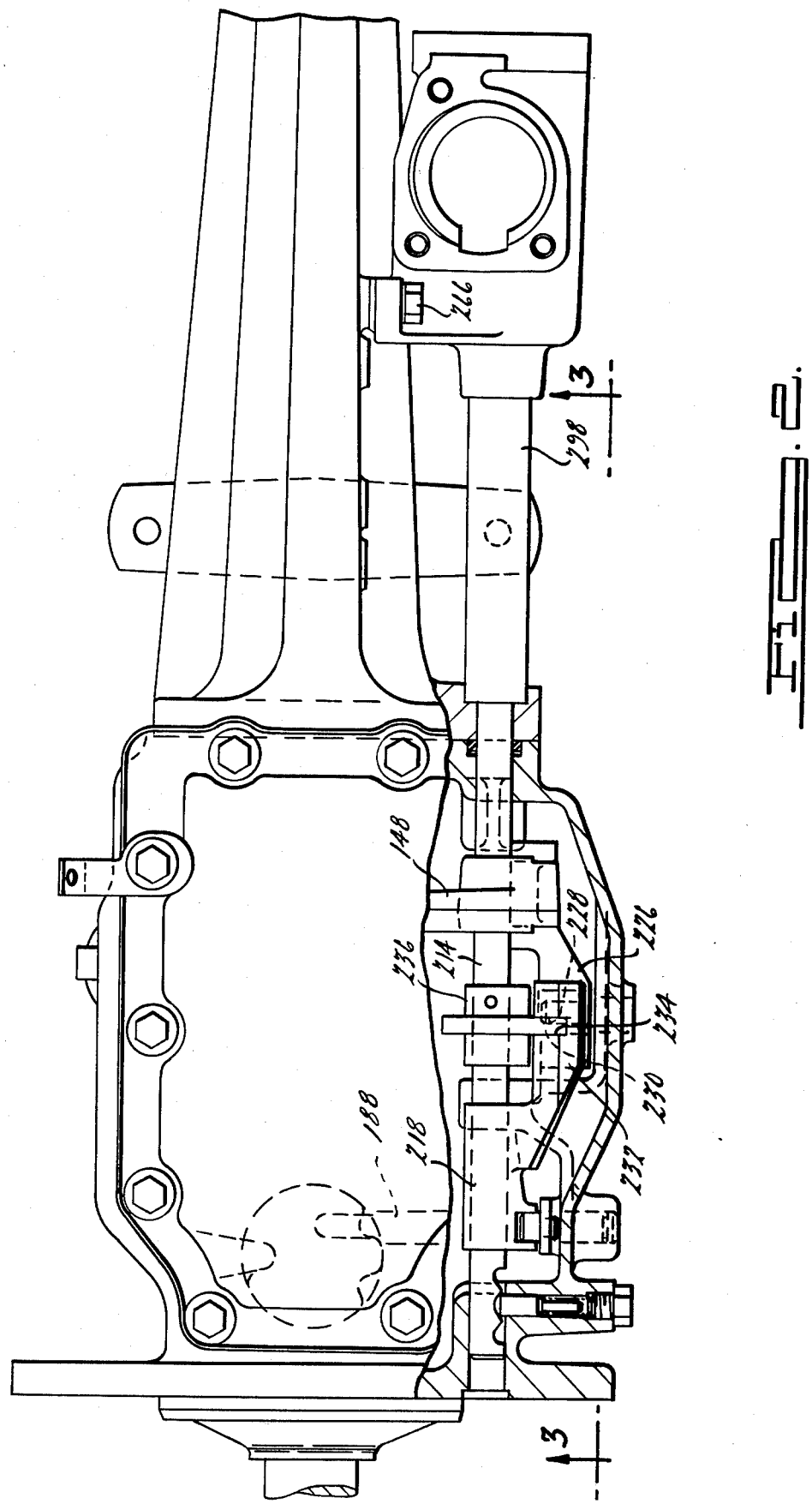
FIG. 2 is a plan view of the structure of FIG. 1 with a portion of the cover for the transmission of FIG. 1 being removed to show the shifting mechanism in more detail.

The shift fork 148 is supported slidably by the shift rail 214. The shift fork 148 includes a collar 224 which carries a foot 226, as best seen in FIG. 2. This foot has a recess 228 that is adapted to receive a pin 230 when the pin is moved into registry with it.

The collar 218, which was described previously wih reference to FIG. 4, also includes a foot as seen in FIG. 2 at 232. The foot 232 overlies the foot 226, as seen in FIG. 2 as well as in FIG. 3. Like the foot 226 the foot 232 is formed with a slot 234 that is adapted to register with the pin 230 when it is aligned with it. The pin 230 is secured or fixed to the collar 236, which is pinned or otherwise fixed to the shift rail 214.

An interlock plate 238 surrounds the shift rail 214. It is loosely mounted on the shift rail 214, and it includes a slot 240 through which the pin 230 extends. As the pin 230 rotates about the axis of the shift rail 214 upon rotation of the shift rail 214, the interlock plate 238 also is caused to rotate. It is held fast against movement in a fore-and-aft direction by a slot 242 formed in the transmission case 10, as seen best in FIG. 3. The outline of the interlock plate 238 is best seen in FIG. 5. It is shown in an end view in FIG. 3.

The synchronizer fork collar 224 includes a plate 244 which is adapted to receive pin 230 when the pin is in the position shown in FIG. 5. At that time the pin will move the shift fork 148 in a fore-and-aft direction as the shift rail 214 is moved fore-and-aft because the collar 224 on the shift fork 148 becomes locked to the rail 214 by the pin in the registering slot in the plate 244. If the pin 230 is rotated in a clockwise direction as seen in FIG. 5, it is adapted to register with a slot 246 formed in the foot 232. Axial movement of the shift rail 214 then will cause shifting movement of the collar 218 in a fore-and-aft direction, thus actuating the shift fork 188. Movement of the pin 230 in a counterclockwise direction as seen in FIG. 5 will cause it to register with a slot 248 formed in the relay lever 134. Upon subsequent movement of the shift rail 214, the reverse shift fork 110 is actuated.

When the pin 230 registers with the slot 246, the interlock plate 238 registers with the slots 244 and 248, thus locking the shift forks 110 and 148 against shifting movement of the shift fork 188. Similarly, the interlock plate locks the relay lever 134 and the shift fork 188 when the pin is moved to the position shown in FIG. 5. If the pin 230 is moved in a counterclockwise direction to cause it to engage the relay lever 134, the shift fork 148 and the shift fork 188 become locked by the interlock plate 238.

Figure 6:
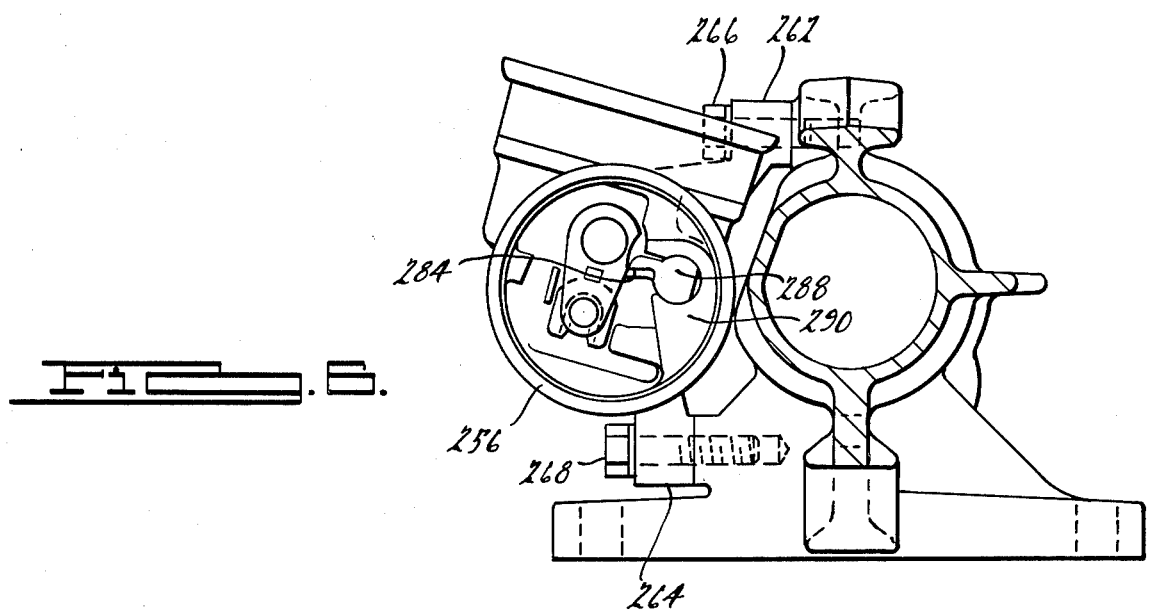
FIG. 6 is a cross-sectional view taken along the plane of section line 6—6 of FIG. 1.
Figure 7:
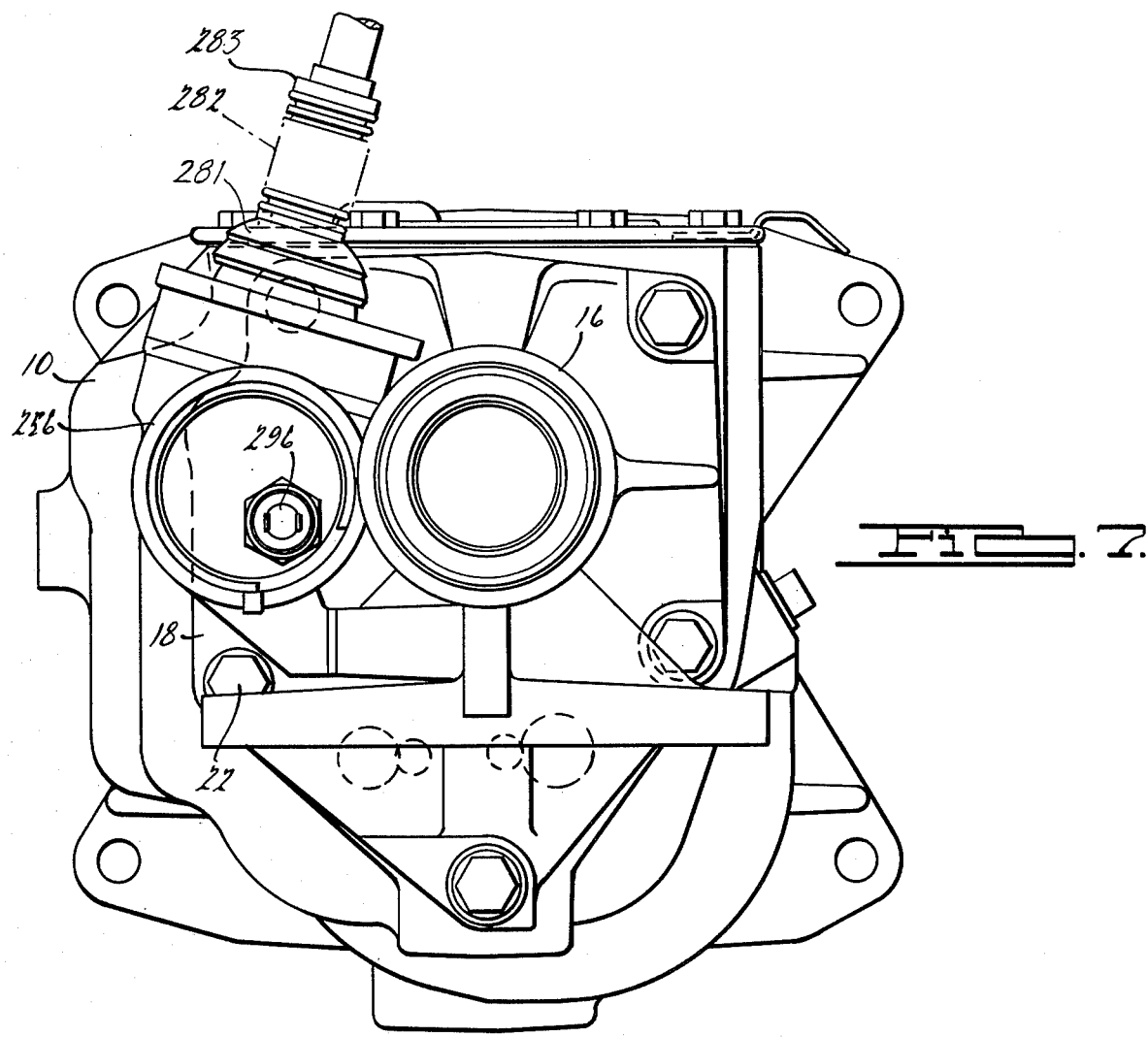
FIG. 7 is an end view of the transmission mechanism of FIG. 1 as seen from the plane of section line 7—7 of FIG. 1.

The rotary motion of the shift rail 214 and the axial shifting movement of the shift rail 214 is accomplished by the shift cane assembly shown in the right hand side of the assembly of FIG. 1 and in FIGS. 6 and 7. The shift cane, which is shown at 250, is formed with a generally semi-spherical bearing 252 which registers with a hold-down plate 254 which is provided with a registering internal spherical surface. The plate 254 is bolted to a side mounted cane housing 256, which has an opening 258 through which the cane 250 is received. A nylon bearing in generally spherical form surrounds the bearing 252 as seen at 260. The cane housing 256 is provided with flanges 262 and 264 which are bolted to the side of the tailshaft extension housing 16 by suitable clamping bolts 266 and 268, respectively.

The base of the cane 250 carries a pair of fork parts 270 which straddle the offset shift lever portion 272. Shift lever portion 272 carries a pair of stops 274 and 276 situated fore-and-aft of the forked parts 270. The offset shift rail portion 272 is joined to the shift rail 214 by arm 278, thereby defining a crank as best seen in FIG. 1. It is apparent, therefore, that if the cane 250 is moved in a plane that is perpendicular to the plane of the section of FIG. 1 the shift rail 214 will be rotated about its axis. It is apparent also that if the cane 250 is oscillated in a plane parallel to the plane of the section of FIG. 1, the shift rail 214 will be moved fore-and-aft in the direction of its axis. Thus the cane is capable of imparting a compound motion to the shift rail 214.

The cane 250 is slidably received in a central opening 280 formed in the bearing 252. A spring seat 281 surrounding the cane 250 is held against the stamping 254. The operating end of the spring, which is shown at 282 in FIG. 7, acts against a shoulder 283 carried by the cane 250, thus normally urging the cane in an upward direction as seen in FIG. 1. If the cane 250 is pressed in a downward direction i.e., transverse to the axis of the shift rail 24, as seen in FIG. 1, a shoulder 284 formed on one side of the base of the cane 250 will be moved until it is below the edge 286 of a stop 288 that is fixed to the housing 256 thereby permitting movement of the cane perpendicular to the plane of FIG. 1 until the stop contacts the cane which movement causes the shift rail 214 to rotate into a reverse drive position. The stop can be seen in both FIG. 1 and FIG. 6. It is held in a boss 290, which is formed on the interior of the housing 256. When in the upwardly biased position, a first part of the shift cane, namely the shoulder 284, contacts the stop 288, as shown in FIG. 6, and movement of the cane 250 tending to rotate the shift rail 214 is prevented. For purposes of clarity the cap that normally would close the end of the housing 256 is not shown in FIG. 6 so that the interior of the housing can be seen. The cap, however, is shown in FIG. 1 and is identified by reference character 292. It is adapted to carry a backup light switch 296 that is engaged by the boss or stop 274 on the offset portion 272 on the shift rail when the shift rail is moved to the reverse position.

A dust cover sleeve shaft 298 surrounds the shift rail 214. One end of the dust cover 298 is received within an opening 300 in the end wall 18 of extension housing 16, and the other end of the dust cover is received within an opening 302 in the end of the housing 256.

Having thus described an improved embodiment of my invention, what I claim and desire to secure by U.S. Letters Patent is:

1. A multiple speed manual transmission mechanism comprising, an input shaft, an input gear connected to said input shaft, an intermediate shaft disposed coaxially with said input shaft, an overdrive gear journalled on said intermediate shaft, a synchronizer clutch means connected to said intermediate shaft for selectively connecting said input gear and said overdrive gear to said intermediate shaft, a shift rail mounted for shifting movement adapted to cause the transmission to operate in any of its forward or reverse speed ratios, a shift fork engageable with said synchronizer clutch means and mounted for sliding motion on an axis parallel to the axis of said shift-rail, and a pivotally mounted reversing lever engageable with said shift rail and said shift fork whereby said shift fork is moved in one direction upon shifting movement of said shift rail in the opposite direction, thereby causing said synchronizer clutch means to connect either said input gear or said overdrive gear to said intermediate shaft.

2. A multiple speed manual transmission shifting mechanism comprising a transmission housing having a forward wall and a rearward wall, a tail shaft extension housing secured to said rearward wall, a shift rail extending in the direction of the axis of said intermediate shaft through said housing, an input shaft, an output shaft and an intermediate shaft situated in coaxial relationship, a shift cane housing secured to said tail shaft extension housing, the rearward end of said shift rail having an offset portion defining a shaft that has an axis parallel to the axis of said shift rail, a shift cane mounted in said shift cane housing for universal movement, means for adjusting said cane in a direction transverse to the direction of the axis of said shift rail, said cane extending in a generally vertical direction and having a depending portion defining fork parts that straddle said offset portion, said offset portion having stops engageable with said fork parts whereby said shift rail is shifted in the direction of its axis upon movement of said cane in a first plane of oscillation, said shift rail being rotated upon oscillation of said cane in a second plane of oscillation perpendicular to said first plane of oscillation, stop means for limiting the extent of movement of said shift cane in said second plane of oscillation as said stop means engages a first part of said shift cane and means for displacing said shift cane in a direction transverse to the direction of the axis of said shift rail to cause said stop means to engage another part of said shift cane whereby the extent of angular movement of said shift cane in said second plane of oscillation in one direction is increased thereby causing said shift rail to assume a reverse drive position.

3. A multiple speed manual transmission mechanism comprising an input shaft, an output shaft and an intermediate shaft situated in coaxial relationship, the intermediate shaft being joined to the output shaft, a transmission housing, a tailshaft extension housing surrounding said output shaft, said transmission housing having a forward wall and a rearward wall, the extension housing being secured to said rearward wall, an input gear in said housing connected to said input shaft, first and second underdrive gears in said housing, an overdrive gear in said housing, said underdrive gears and said overdrive gear being journalled on said intermediate shaft, first synchronizer clutch means on said intermediate shaft for connecting selectively said first underdrive gear to said intermediate shaft and said second underdrive gear to said intermediate shaft, a second synchronizer clutch means connected to said intermediate shaft for connecting selectively said input gear and said overdrive gear to said intermediate shaft, a cluster gear assembly mounted in said housing for rotation about an axis parallel to the axis of said intermediate shaft and including gear elements respectively engaged with said input gear and said overdrive gear and each of said underdrive gears, a reverse drive pinion assembly journalled for rotation about a second axis parallel to the axis of said intermediate shaft including a reverse pinion engageable with one of the gear elements of said cluster gear assembly, a shift rail extending in the direction of the axis of said intermediate shaft through said housing adapted to cause the transmission to operate in any of its forward or reverse speed ratios, a rail selector carried by said shift rail, a shift fork slidably mounted on said shift rail, said first synchronizer clutch means including a synchronizer clutch sleeve engaged and actuated by said shift fork, a first collar carried by said shift fork, a second collar slidably mounted on said shift rail, each collar having an extension with recesses adapted to be engaged by said rail selector selectively upon rotary movement of said rail selector into registry with said recesses thereby connecting said collars to said shift rail, a second shift fork engageable with said second synchronizer clutch means and mounted for sliding movement on an axis parallel to the axis of said shift rail, a reversing lever connecting said second collar to said shift rail whereby said second shift fork is moved in one direction upon shifting movement of said shift rail in the opposite direction, a shift cane housing secured to said tailshaft extension housing, the rearward end of said shift rail having an offset portion defining a shaft that has an axis parallel to the axis of said shift rail, a shift cane mounted in said cane housing for universal movement, means for adjusting said cane in a direction transverse to the direction of the axis of said shift rail, said cane extending in a generally vertical direction and having a depending portion defining fork parts that straddle said offset portion, said offset portion having stops engageable with said fork parts whereby said shift rail is shifted in the direction of its axis upon movement of said cane in a first plane of oscillation, said shift rail being rotated upon oscillation of said cane in a second plane of oscillation perpendicular to said first plane of oscillation, stop means for limiting the extent of movement of said shift cane in said second plane of oscillation as said stop means engages a first part of said shift cane, and means for displacing said shift cane in a direction transverse to the direction of the axis of said shift rail to cause said stop means to engage another part of said shift cane whereby the extent of angular movement of said shift cane in said second plane of oscillation in one direction is increased thereby causing said shift rail to assume a reverse drive position.

\* \* \* \* \*